United States Patent [19]

Weeks

[11] Patent Number: 4,842,287
[45] Date of Patent: Jun. 27, 1989

[54] HELIUM PRESSURE SEAL FOR A CRYOGENIC REFRIGERATOR

[75] Inventor: Alan L. Weeks, Lunenburg, Mass.

[73] Assignee: Helix Technology Corporation, Waltham, Mass.

[21] Appl. No.: 112,222

[22] Filed: Oct. 22, 1987

[51] Int. Cl.[4] .......................... F02F 11/00; F25B 9/00
[52] U.S. Cl. ............................................ 277/53; 62/6
[58] Field of Search ................... 29/558; 62/6; 277/167.5, 25, 12, 53

[56] References Cited

U.S. PATENT DOCUMENTS

| | | | |
|---|---|---|---|
| 858,859 | 7/1907 | Dalén | 277/53 |
| 1,715,854 | 6/1929 | McKenzie-Martyn | 285/331 |
| 1,880,115 | 9/1932 | Smith et al. | 29/506 |
| 1,906,826 | 5/1933 | Smith et al. | 285/331 |
| 2,050,137 | 8/1936 | Walsh | 285/120 |
| 3,208,758 | 9/1965 | Carson et al. | 277/171 |
| 3,234,708 | 2/1966 | Berthiaume et al. | 53/88 |
| 3,321,926 | 5/1967 | Chellis | 62/6 |
| 3,617,075 | 11/1971 | VanHorn | 285/13 |
| 4,303,251 | 12/1981 | Harra et al. | 277/236 |
| 4,418,918 | 12/1983 | Nicoll | 277/1 |
| 4,616,860 | 10/1986 | Faria et al. | 277/167.5 X |

FOREIGN PATENT DOCUMENTS 675262 7/1979 U.S.S.R. .......................... 277/167.5

Primary Examiner—Donald A. Griffin
Attorney, Agent, or Firm—Hamilton, Brook, Smith & Reynolds

[57] ABSTRACT

A pressure seal used for containing helium within a cryogenic refrigerator, which utilizes a linear drive assembly. A deformable gasket is used to seal the enclosing elements of the linear drive assembly to reduce helium leakage. Concentrically serrated members compress onto opposite sides of the soft metal gasket to form labyrinthine sealing grooves therein.

4 Claims, 4 Drawing Sheets

HELIUM PRESSURE SEAL FOR A CRYOGENIC REFRIGERATOR

BACKGROUND OF THE INVENTION

The present invention relates to pressure seals and more particularly to deformable gasket seals for pressurized helium containment within the linear drive system of a cryogenic refrigerator.

Helium cryogenic refrigerators utilize a linear drive assembly in which gaseous helium undergoes substantial variations in pressure. Due to the small size of the helium atom, there are substantial problems in obtaining simple inexpensive methods of sealing pressurized helium within such a refrigerator.

The most common seals used in pressurized devices are O-rings and gaskets composed of elastomeric compounds. These seals are generally positioned within mating grooves in adjacent parts. When exposed to temperature and pressure excursions that frequently occur in cryogenic refrigerators such elastomeric seals degrade causing leakage and thus loss of efficiency or failure.

Existing helium cryogenic refrigerators have used indium or other soft metals as O-rings within mating grooves to contain pressurized helium. U.S. Pat. No. 4,418,918, for example, discloses the use of a deformable metal ring, preferably made of indium, that is plastically deformed by a triangular shaped anti-rotation ring. The anti-rotation ring is compressed into the indium ring forming a V-shaped groove, thereby sealing the junction between rotatably secured members of a cryogenic refrigerator. Indium absorbs and retains radiation making it unsuitable for applications with possible exposure to radiation sources.

SUMMARY OF THE INVENTION

The present invention utilizes a deformable gasket; preferably a soft metal, such as copper, sandwiched between two members which partially enclose the linear drive of a helium cryogenic refrigerator. These members have concentric serrations contacting opposite sides of the gasket. As the two members are comprised of metals much harder than the gasket, the application of pressure which forces the members together will cause the serrations of both members to be driven into the gasket material. The gasket is thereby deformed with concentric grooves on both sides, which match the serrations of the two "jaws" or members. The resulting labyrinth of circular grooves forms an effective seal against helium that is less sensitive to surface finish than traditional helium sealing methods.

The compressive force of the jaws on the gasket causes the bulging or expansion of its outer and inner diameters. One of the members forms an axial wall opposite the outer diameter or rim of the gasket. This wall contacts and supports the deformed gasket, thereby opposing radial forces caused by the positive pressure of helium within the refrigerator.

The copper gasket of a preferred embodiment of the invention is easily machined for throw away cost and has thermal stability over a range of ambient temperatures by approximately matching the thermal expansion coefficients of the seal assembly with the gasket.

The above, and other features of the invention, including various novel details of construction and combination of parts, will now be more particularly described with reference to the accompanying drawings and pointed out in the claims. It will be understood that the particular helium pressure seal embodying the invention is shown by way of illustration only and not as a limitation of the invention. The principle features of this invention may be employed in various embodiments without departing from the scope of the invention.

DETAILED DESCRIPTION OF THE INVENTION

Figure 1:
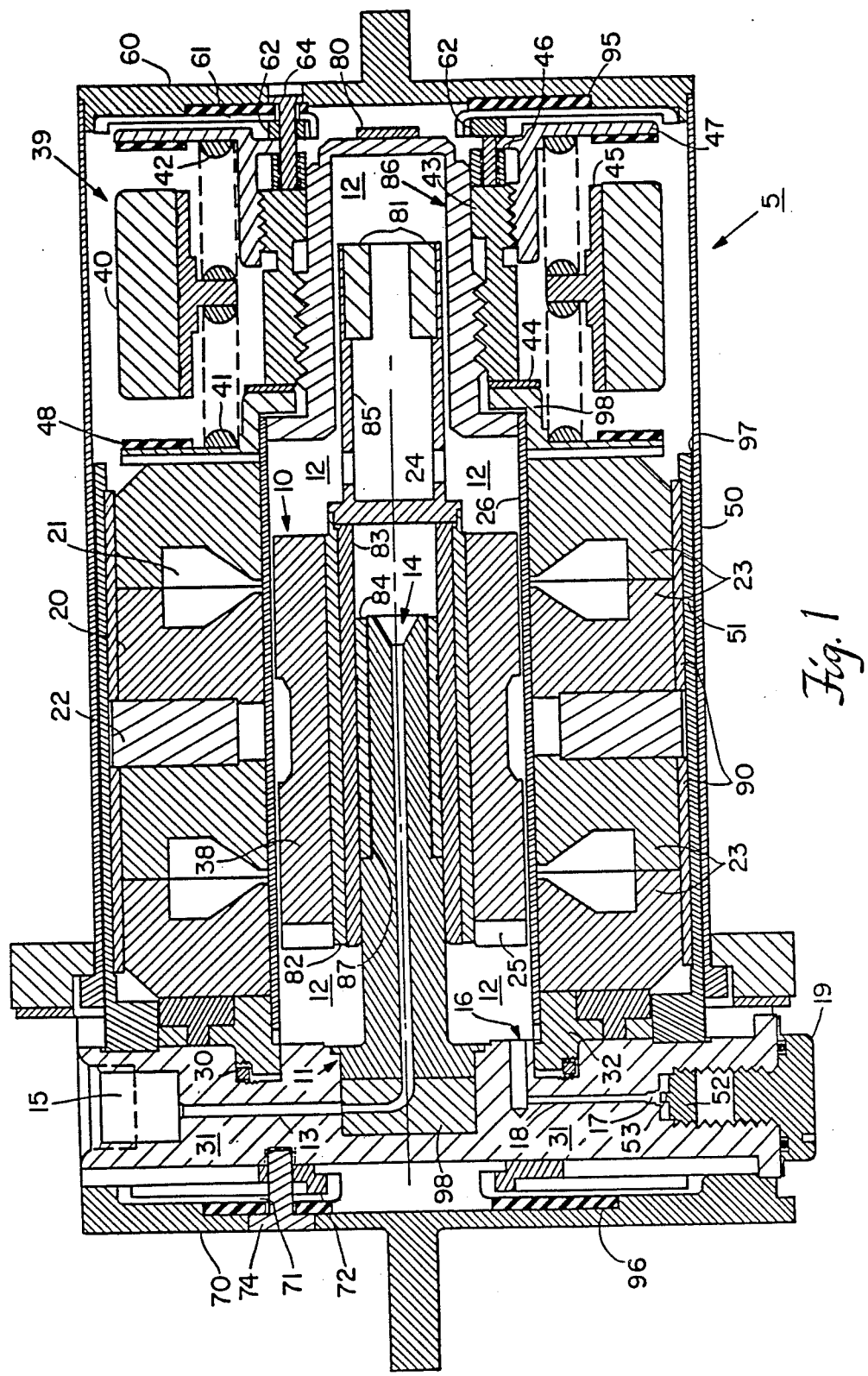
FIG. 1 is a cross-sectional view of a linear drive assembly of a helium cryogenic refrigerator with the deformable gasket of the present invention.

A linear drive assembly of a helium cryogenic refrigerator utilizing a seal of the present invention is illustrated in FIG. 1. A linear motor is used to control the movement of an armature 10 in the compressor 5 and the movement of a displacer (not shown). The linear motor utilizes an involute laminated stator 20 first disclosed in U.S. Patent application Ser. No. 885,218, of G. Higham et al. filed July 14, 1986 entitled "Cryogenic Refrigeration System Having an Involute Laminated Stator for its Linear Drive Motor."

As shown in FIG. 1, this compressor 5 comprises a reciprocating armature 10 which compresses helium gas in a compressor head space 24. From the head space 24 the gas passes through a port 14 in the stationary piston 11 to pre-formed bores through the piston 11 and plate 31 to form conduit 13. Conduit 13 runs along the core of stationary piston 11, then curves at a right angle in insert 98 to a gas fitting assembly 15. From the gas fitting assembly 15, gas is delivered to a cold finger of a cryogenic refrigerator such as a split Stirling refrigerator in which a displacer is housed as disclosed in U.S. Pat. No. 4,545,209. The stationary piston 11, mounted at one end onto plate 31, is the sole support for armature 10.

Plate 31 provides for a lead ball 53 and retainer screw 52 for sealing the port 17. The compressor is charged with helium gas through the port 17. The gas is allowed to communicate with an armature volume 12 of the piston cylinder through port 16 which is in communication with a second pre-formed conduit 18. During the compressor operation, however, the ball 53 is fixed against the plate 31 by the retainer screw 52 to close the port 17. A protective dust cover screw 19 is provided to prevent dirt and debris from entering the ball 53 and screw 52 seal.

The armature 10 comprises an iron mass 38 fixed to a liner core 82. Iron is used because of its high magnetic permeability and high magnetic induction; however, other materials having the same characteristics may be used. A tungsten alloy ring 25, or other high density non-magnetic material, may be incorporated at one end of the armature to give more mass to adjust the resonant frequency of operation and to help keep the armature's center of gravity within the confines of the clearance seal of the piston.

In order to detect the position of the armature a sensor 80 is used to detect a target magnet 81 fitted at one end of the armature 10. The magnet 81 is mounted on an extended cylinder 85 that oscillates within an extension 86 of the armature housing 26 during motor operation. By isolating the magnet 81 and sensor 80 away from the stator 20, the magnetic field of magnet 80 is decoupled from the magnetic field of the stator magnet 22. Preferably, the piston 11 is closely fitted within a ceramic cylinder 83 attached to armature 10 to provide a clearance seal therebetween. It is preferred that a sleeve 82, made of a non-magnetic, high resistivity, stainless steel line the cylinder 83. A cermet liner 84 is mounted on the piston 11 to form part of the clearance seal.

Surrounding the armature 10 just described is a pressure housing 26. The size of the pressure housing is constructed to allow helium gas in the working volume 12 to flow freely between the pressure housing 26 and the iron mass 38 as the armature 10 shuttles back and forth.

A stator 20 is located around the perimeter of the pressure housing 26. The stator 20 comprises two coils 21 positioned between involute laminations 23 and separated by a magnet 22. This static assembly is further described in U.S. Ser. No. 885,218, by G. Higham et al. recited above, which is incorporated herein. Two shields 90 have been concentrically disposed about the involuted laminations 23 to convey the magnetic flux lines along the inside wall 51 of the housing 50.

As a consequence of the armature 10 reciprocating back and forth, mechanical vibrations are produced by the compressor 5. To eliminate the vibrations, a passive vibration absorber or dynamic absorber 39 is attached to one end of the compressor and is tuned to resonate at the same frequency as the compressor's operating frequency. Preferably, the dynamic absorber 39 comprises a counterbalance mass 40 mounted with flange 45 between two springs 41 and 42 having small damping characteristics. As a result, the axial motion of the compressor is countered by the axial vibration from the counterbalance mass 40 of the absorber 39. A further description of dynamic absorber operation is found in U.S. Ser. No. 894,777, of G. Higham et al., filed Aug. 8, 1986, entitled "A Vibration Isolation System for a Linear Reciprocating Machine."

The present invention utilizes isolators mounted on opposite ends of the compressor. The two isolators have flat spiral springs 61 and 71 which are soft in the axial direction while being very stiff in the radial direction. The outer diameter of the two springs 61 and 71 are attached to the housing end plates 60 and 70 respectively. The inner diameters are mounted onto flanges 62 and 72 using bolts 64 and 74. The springs are mounted on elastomeric material 95 and 96 located at both ends of compressor 5 providing a substantial level of damping to the isolator system. Grease is applied to the outside surface of wall 51 to help remove heat from the stator 20 while providing damping of internal vibration of the compressor.

Figure 2:
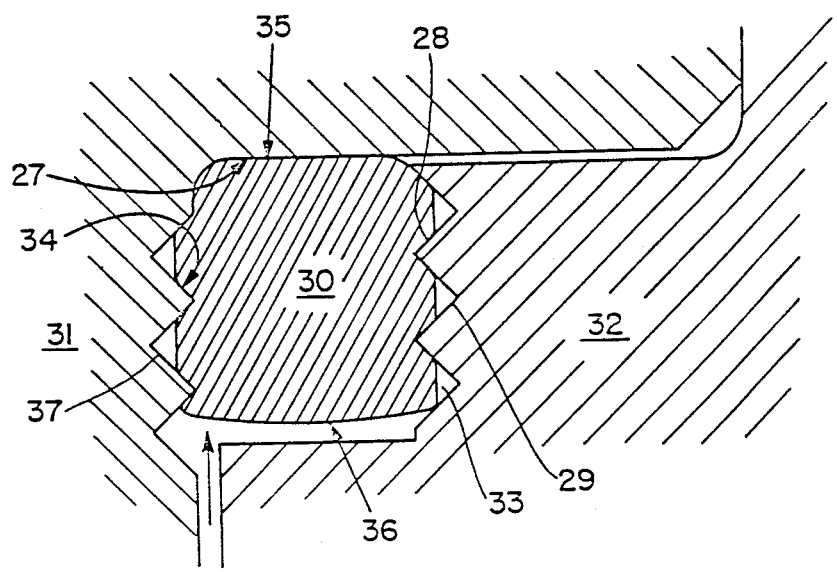
FIG. 2 illustrates a magnified view of a cross-section of the gasket deformed by serrated members.

A soft metallic gasket 30 is configured between the plate 31 and flange 32 that is deformed to seal the armature volume 12 of the linear drive unit from the external atmosphere. FIG. 2 illustrates a magnified view of the deformed gasket 30 of the present invention. A plate 31 with serrations 37 is forced against gasket 30 to form the grooves 34 on one side thereof. The serrations 29 of flange 32 are disposed on the opposite side of gasket 30 to create grooves 28. The serrations 37 of plate 31 mate with the serrations 29 of flange 32 so that the grooves 34 corresponding to plate 31 are offset from the grooves 28 of the flange 32. The cavity adjacent each serration of the plate 31 and flange 32 is at least 20% filled by volume with the gasket material to insure a sufficiently long leakage path across the sealed gasket surface.

Figure 3:
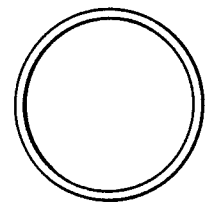
FIG. 3 illustrates a plan view of a gasket.

The gasket material is capable of withstanding a large temperature range between $-62°$ C. and $71°$ C. that such a refrigerator may typically encounter. The coefficient of thermal expansion of the gasket material can be closely matched with the thermal coefficients of both the plate 31 and the flange 32 to insure the integrity of the seal during thermal transitions. Low yield stress characteristics of the selected gasket material allow it to conform with the serrations on mating plate 31 and flange 32 to compensate for mismatches in the coefficient of thermal expansion. The gasket material is also relatively impermeable with respect to helium whose small atomic size renders container permeability a significant problem. A preferred embodiment utilizes annealed copper for the gasket material. FIG. 3 illustrates a copper gasket annealed at $1000°$ F. for 30 minutes before being deformed by plate 31 and flange 32. Annealing renders the gasket oxygen free with a hardness of about 40 on the Rockwell F scale. The gasket can maintain helium pressures of over 1000 psi with leak rates of less than $2 \times 10^{-8}$ scc He/sec.

The axial wall 35 of plate 31 is concentrically disposed about the gasket 30. The outer diameter or rim surface 27 of the gasket has been deformed by the compression of plate 31 against the gasket 30 and flange 32. Surface 35 of plate 31 provides support for surface 27 of gasket 30 with pressure loads applied on surface 36. As the piston is driven back and forth within the linear drive, there are large variations in pressure at seal 30 during each cycle. The axial support wall 35 is used to counter the radial forces at peak pressures tending to displace the seal radially outward.

The surface of the inner diameter 36 also bulges slightly. However, there is no requirement in the present embodiment that there be any support for the inner diameter of the gasket, as there is a positive pressure within the drive unit during normal operation. The tight annular clearances between the plate 31 and flange 32 are for alignment purposes and do not contribute to the sealing ability of the joint. The seals 30 and the lead ball 53 and screw 52 seal are the only replaceable seals used within the compressor assembly to retain helium. The remaining joints defining the armature volume between the flange 32 and pressure housing 26 as well as between the housing 26 and the extended cylinder 86 are both welded.

Figure 4:
FIG. 4 illustrates a magnified view of a portion of a deformed gasket with concentric grooves therein.
Figure 5:
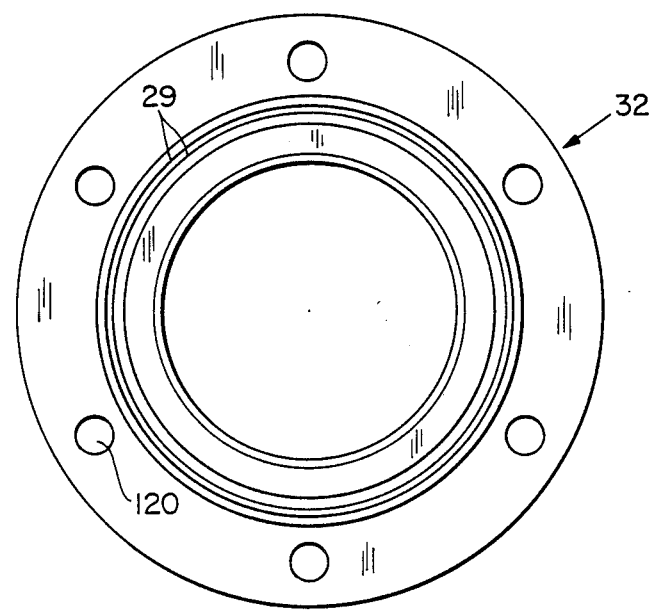
FIG. 5 illustrates a magnified view of a flange with concentric serrations used to form a seal with the gasket.
Figure 6:
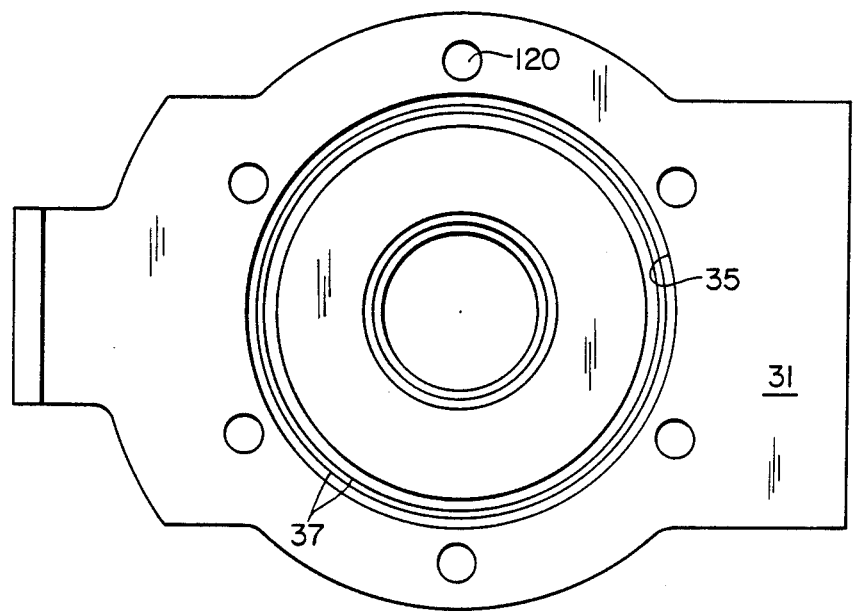
FIG. 6 illustrates a magnified plan view of a plate covering one end of the drive assembly with concentric serrations to form a seal.

FIGS. 4, 5, and 6 illustrate magnified views of a portion of the deformed gasket, and plan views of the flange 32 and plate 31 showing the concentric serrations 29 and 37 of each member, respectively. Holes 120 are for bolts 121, which are used to compress the plate 31 and flange 32 together are arrayed about the serrations of each member to provide a uniform distribution of pressure. There are preferably at least two concentric serrations on both the flange 32 and plate 31 so that both leakage paths form a long labyrinth.

I claim:
1. A seal for pressurized gaseous claim helium containment comprising:

a deformable gasket;

first and second members enclosing pressurized helium and having a plurality of concentric serrations such that said gasket is positioned between the serrations of said members;

pressure means for applying pressure to said first and second members such that said serrations deform the gasket forming concentric grooves therein to form a seal; and an axial wall concentric about the gasket such that the wall supports the gasket.

2. A seal as recited in claim 1 wherein said applied pressure deforms a grooveless outer rim of the gasket such that the outer rim expands to contact the wall.

3. A seal as recited in claim 2 wherein said pressurized helium exerts radial forces on the gasket which are opposed by the axial support wall.

4. A seal for pressurized helium containment comprising:

a deformable gasket with inner and outer rims such that the inner rim confines pressurized helium and the outer rim is exposed to a fluid at a pressure lower than the helium;

first and second members enclosing pressurized helium and having a plurality of concentric serrations such that said gasket is positioned between the serrations of said members;

pressure means for applying pressure to said first and second members such that said serrations deform the gasket forming concentric grooves therein to form a seal; and an axial wall concentric about the outer rim of the gasket such that the wall supports the outer rim.

* * * * *